US010878473B1

(12) United States Patent
Thekkanal (10) Patent No.: US 10,878,473 B1
(45) Date of Patent: Dec. 29, 2020

(54) CONTENT MODIFICATION

(71) Applicant: Amazon Technologies, Inc., Reno, NV (US)

(72) Inventor: Rohit Thekkanal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 15/815,526

(22) Filed: Nov. 16, 2017

(51) Int. Cl.
    *G06Q 30/00* (2012.01)
    *G06Q 30/06* (2012.01)
    *G06F 16/242* (2019.01)
    *G06F 16/9535* (2019.01)

(52) U.S. Cl.
    CPC ....... *G06Q 30/0623* (2013.01); *G06F 16/243* (2019.01); *G06F 16/9535* (2019.01); *G06Q 30/0625* (2013.01); *G06Q 30/0627* (2013.01); *G06Q 30/0641* (2013.01)

(58) Field of Classification Search
    CPC ............ G06F 16/0243; G06F 16/9535; G06Q 30/0623; G06Q 30/0625; G06Q 30/0627; G06Q 30/0641
    See application file for complete search history.

(56) References Cited

U.S. PATENT DOCUMENTS

| | | | | |
|---|---|---|---|---|
| 5,953,718 A * | 9/1999 | Wical | ............... | G06F 16/345 |
| 6,199,061 B1 * | 3/2001 | Blewett | ............... | G06F 16/3334 |
| 6,751,606 B1 * | 6/2004 | Fries | ............... | G06F 16/951 |
| 9,317,550 B2 * | 4/2016 | Zhu | ............... | G06F 16/951 |
| 9,342,601 B1 * | 5/2016 | Finkelstein | ............... | G06F 16/951 |
| 10,445,376 B2 * | 10/2019 | Azimi | ............... | G06F 40/284 |
| 10,565,533 B2 * | 2/2020 | Keyngnaert | ............... | G06Q 50/184 |
| 10,607,253 B1 * | 3/2020 | Shachar | ............... | G06Q 30/0244 |
| 10,671,653 B2 * | 6/2020 | Tijssen | ............... | G06F 40/289 |
| 2007/0168465 A1 * | 7/2007 | Toppenberg | ............... | G06Q 30/02 |
| | | | | 709/218 |
| 2008/0177717 A1 * | 7/2008 | Kumar | ............... | G06F 16/3322 |
| 2009/0106237 A1 * | 4/2009 | Holstein | ............... | G06F 16/972 |
| 2009/0210301 A1 * | 8/2009 | Porter | ............... | G06Q 30/02 |
| | | | | 705/14.54 |
| 2010/0121864 A1 * | 5/2010 | Stuhec | ............... | G06F 16/24 |
| | | | | 707/758 |

(Continued)

OTHER PUBLICATIONS

"Finding Needles in the Textstacks," by Ernest Perez, Online 25.5: 34-43 Information Today, Inc. (Sep./Oct. 2001) (Year: 2001).*

Primary Examiner — Anne M Georgalas
(74) Attorney, Agent, or Firm — Hogan Lovells US LLP (57) ABSTRACT

Systems and methods are disclosed to modify content in accordance with a query and based at least in part on semantic relationships between terms in the content and query. An initial determination is performed for first identifiers from a query. A further determination is performed for a first semantic relationship that includes a first measure between the first identifiers. A second semantic relationship with second measures of relationships is determined between each of the identifiers and a plurality of terms in a database of terms. A search is performed of a content database using the first identifiers. Retrieved titles associated with a match from the search are subject to modification in their respective titles based at least in part on the first measure and the second measures. Content with the modified title is provided to a client device.

17 Claims, 8 Drawing Sheets

(56) References Cited

U.S. PATENT DOCUMENTS

| | | | |
|---|---|---|---|
| 2011/0191180 A1* | 8/2011 | Blackhurst | G06Q 30/0255 705/14.53 |
| 2013/0096910 A1* | 4/2013 | Stan | G06F 40/30 704/9 |
| 2014/0067368 A1* | 3/2014 | Yih | G06F 16/3338 704/9 |
| 2014/0163957 A1* | 6/2014 | Tesch | G06F 40/30 704/9 |
| 2015/0039416 A1* | 2/2015 | Sullivan | G06Q 30/0276 705/14.43 |
| 2015/0331929 A1* | 11/2015 | El-Saban | G06F 16/50 707/739 |
| 2018/0006979 A1* | 1/2018 | Barsness | G06F 40/253 |
| 2019/0073592 A1* | 3/2019 | Luo | G06Q 10/0637 |
| 2019/0073593 A1* | 3/2019 | Luo | G06Q 10/10 |
| 2019/0147041 A1* | 5/2019 | Dey | G06F 40/117 704/9 |

* cited by examiner

DISTRIBUTED REPRESENTATION VECTORS

|  | DEVICES | UPTO 6.0 |  |  |  |
|---|---|---|---|---|---|
| SMARTPHONE → | 0.73 | 0.80 | . | . | ... |
| COMPATIBLE → | 0.99 | 0.98 | . | . | . |
| WATERPROOF → | 0.23 | 0.34 | . | . | . |
| CUP → | 0.07 | 0.08 | . | . | . |
| MODEL 1 → | 0.88 | 0.90 | . | . | . |
| PHONE-A → | 0.95 | 0.96 | . | . | . |
| ACME → | 0.43 | . | . | . | . |
| COMPU → | 0.48 | . | . | . | . |
| ⋮ → | ⋮ | ⋮ | . | . | . |
| XL → | 0.85 | . | . | . | . |

CONTENT MODIFICATION

BACKGROUND

Static content provides limits to displaying content to users of web-based services. As more content is available electronically, users are often required to sift through pages of content to find desired content. Search services provide content as matching to search requests entered through a search engine. Such mechanisms may not captivate a user or may not indicate that the resulting content is relevant to the user's search.

In addition, content providers are often separated from the delivery systems. Delivery systems may track user information and provide select information for the content providers. This may be useful to content providers to determine if the content is attracting target users. Such user information is also useful to provide appropriate content in accordance with the habits of the target users. Any content changes occur after the fact and may not track to current interests of the target user.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing digital content in an electronic environment. In particular, the example systems and methods herein analyze a query entered to a search engine or in an electronic marketplace, and provide content modifications to customize retrieved content semantically in accordance with at least portions of the query. Such processes customize received content to the received query, and to the user's expectations when seeking the content. In an example, the analysis to the query determines identifiers appropriate for modification of retrieved content responsive to the query. Semantic relationships form a basis to determine measures between the identifiers themselves, and additionally, between the identifiers and terms in a database of terms. A search of a content database is performed using the query. In an alternate implementation, the semantic terms determined from the terms in the database based on the semantic relationships may be used in the search to find more accurate results. Retrieved content and related titles are then subject to modification to include the identifiers from the queries in accordance with the semantic relationship between the identifiers in the query and terms in the retrieved content. For example, terms in the related titles of the retrieved content may be replaced with terms from the query itself to provide an appearance of an exact match between the query and the retrieved content.

The reliance on semantic relationships to modify retrieved content is not apparent in typical search processes. The present disclosure resolves a technical question of how to customize—dynamically or in real time—digital content to a user's request. For example, utilizing search patterns after the search has occurred to attempt to target later users may limit the ability to provide targeted content when the search process is dynamic and the results are not. Moreover, the reliance on semantic relationships between identifiers in the search query and terms in a database are a specific implementation of a system and method to modify content responsive to a query, thereby providing the customized content dynamically.

In an example, a user in an electronic marketplace may be interested in a specific product. The user may provide a query in a search field of the electronic marketplace and may receive a number of search results. The search results may include a title and summary specifications associated with an underlying product. This information may, however, be insufficient for the user to determine if the product matches the specific product that the user seeks. As a result, the user may have to investigate each of the search results, by clicking on search result and reading the entire product information. Computers, being data agnostic devices, may not have the configuration or capability to analyze queries and provide modification of content. The present disclosure attempts a specific solution to improving online searching and interaction with digital content for users. In the above example, the improved online searching is provided in a specific automation of analyzing queries for identifiers, and modifying content in results for the queries in accordance with the analysis from the identifiers. This solution incorporates elements from multiple technical aspects as detailed below in order to solve a problem faced by websites offering digital content for searching on the internet. As a result, the features claimed herein amounts to an inventive concept for resolving the above-mentioned internet-specific problem.

Various other functions can be implemented within the various embodiments as well as discussed and suggested elsewhere herein.

Figure 1A:
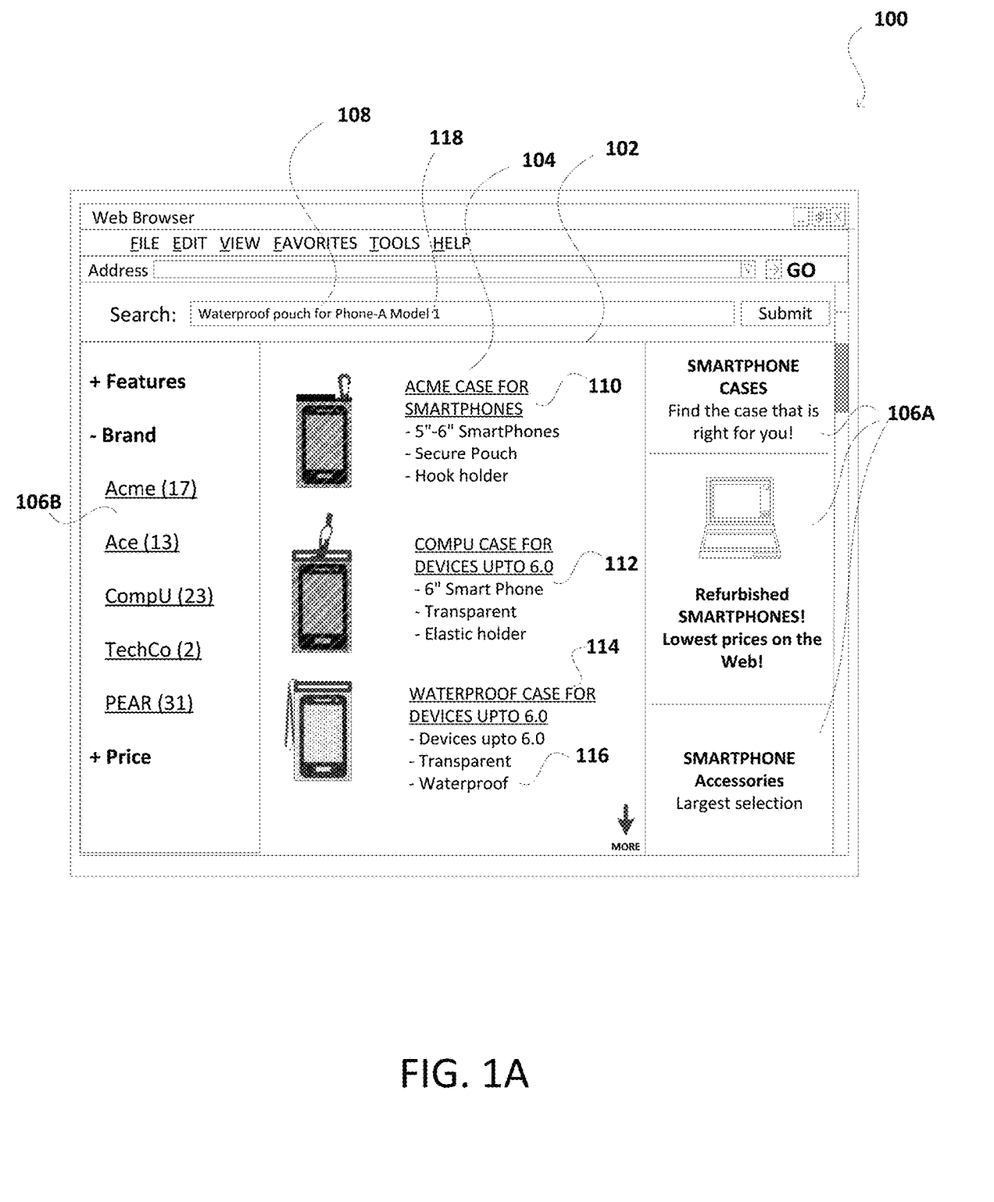
FIG. 1A illustrates an example of a window of search results that can be presented in accordance with various embodiments.

FIG. 1A illustrates an example 100 of a window of search results 104 that can be presented on a display screen of a computer in accordance with various embodiments. In an example, the window may be a web browser or a stand-alone application for interacting with digital content. A user may search or interact with the digital content via a search field 108. A query 118 is provided in the search field 108 in one implementation of the searching or the interaction with digital content. When the submit option is selected, the search may be initiated and processed on the computer or on a server as discussed subsequently in this disclosure. In example 100 of FIG. 1A, a query 118 for "waterproof pouch for PHONE-A MODEL 1" is entered into the search field 108, and the search results are provided in the results section 104 of a webpage or content page 102. As illustrated, there are three results 110-114 on display, with an indication (e.g., down arrow with text "MORE" at the bottom of the page 102 or the grey scroll indicator on the right of the page 102) for more results if the page was scrolled down. The search results may each include summary specifications as shown in example 114 by reference numeral 116. Categories within the search results are presented on one side 106B of the search results, while sponsored content may be displayed on other available area 106A.

The search results 110-114 are illustrated as search results that may require the user to investigate further as to the relevance of each search result. Indeed, the provided title of the content of each search result 110-114 may reflect a product underlying the result. For example, an ACME CASE FOR SMARTPHONES may be a brand name (i.e., ACME) and a product name (i.e., CASE FOR SMARTPHONES). In the alternative, the title provided may be an effort to target specific product searches, long after the searches have been made and the search queries analyzed (e.g., WATERPROOF CASE FOR DEVICES UPTO 6.0). The above titles, however, may not reflect on current search interests of a user and may not product accurate representation of the product searched in the query provided.

Figure 1B:
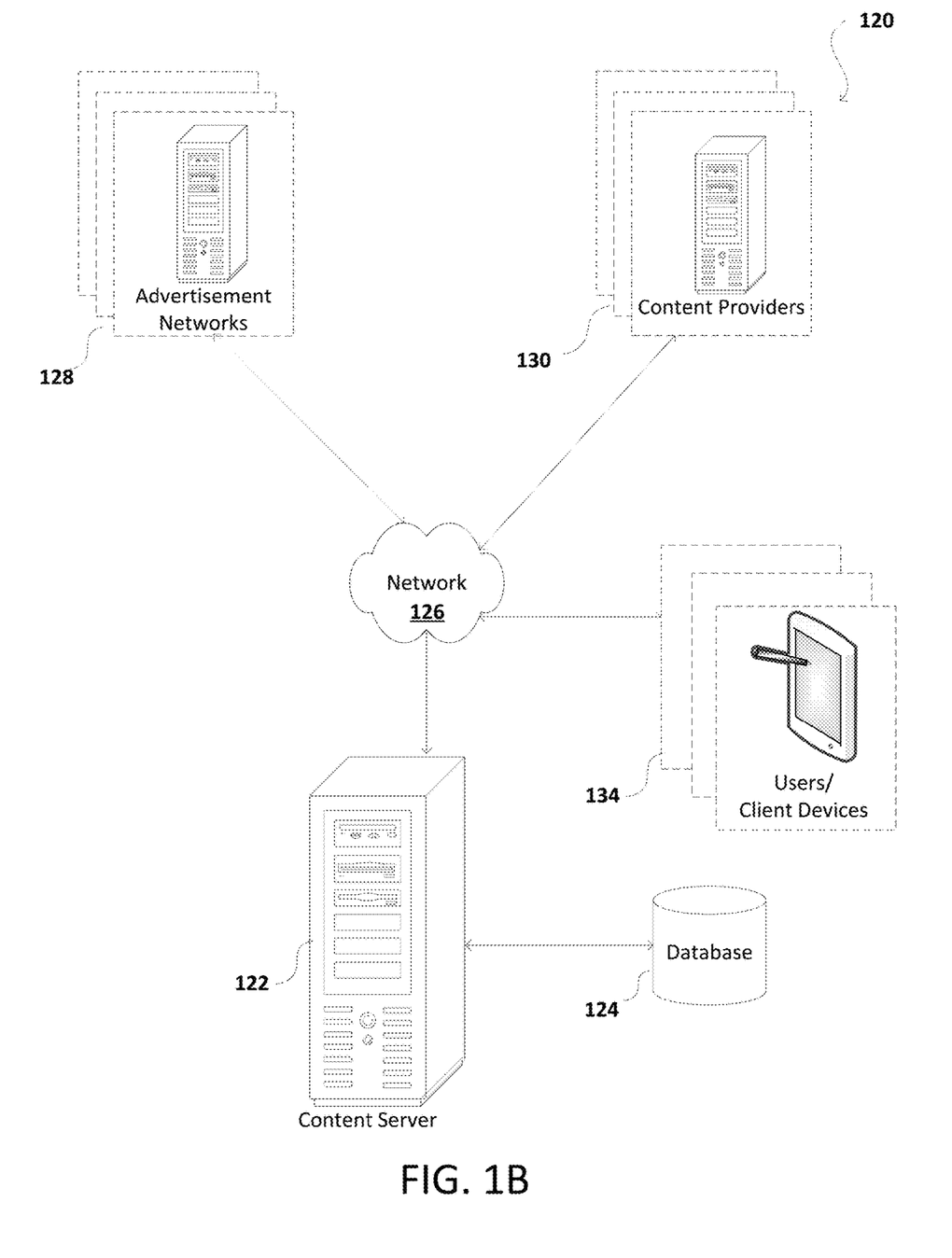
FIG. 1B illustrates an example system architecture for performing the disclosed embodiments in accordance with an aspect of this disclosure.

FIG. 1B illustrates an example system architecture 120 for performing the disclosed embodiments in accordance with an aspect of this disclosure. The example environment 120 may include computing components and network relationships that are applicable for providing the content in the webpage or content page 102 of FIG. 1A. The example environment 120 includes a content server 122 for serving content in response to a search or interaction on the webpage or content page 102, a database 124 for storing content, advertisement, and other related information, advertisement networks for paid content (e.g., content in section 106 of content page 102), and users with computing devices 134 that may send queries or interact with the content server to access the content.

Advertisement networks 128 and content providers 130 are able to utilize respective computing systems and/or devices to interact with the content exchange 122 through the network 126, for example, a local area network (LAN) or wide area network (WAN), e.g., the Internet. Similarly, users with computing devices 134 are able to utilize their respective computing device to access content (e.g., websites or stand-alone web enabled applications) that may be offered through by the content server 122 or via the content providers 130 over the network 126. For example, content providers 130 can provide content (e.g., webpages, product information, etc.) that is accessible over the network 126 (e.g., the Internet). In such an example, the content providers use the content server as a host for interacting with the users/client devices 134. In an alternate implementation, the content server hosts its own services for providing content of the content providers 130, such as an electronic marketplace. In yet another alternative implementation, the content providers 130 may utilize one or more of its own computing systems to provide a website or web-enabled application that is accessible through the network 126. The content provid-ers' website or web-enabled application may offer opportunities to present additional, and in some instances, paid content to users accessing the website; for example, in the form of electronic advertisements or other digital media. The computing devices and/or systems for each of the content server 122, advertisement networks 128, content providers 130, and users with computing devices 134 will each generally include memory for storing instructions and data, and at least one processor for executing the stored instructions that configure the computing devices and/or systems to perform the features disclosed.

Typically, when a user with a computing device 134 uses the computing device to access content from the content server 122 or content providers 130, the relevant content provider 130 can send, either directly or via the content server 122, responsive content to the computing device 134. This access for content can include various requests or searches to find specific content hosted by the content server 122 or content providers 130.

Figure 2:
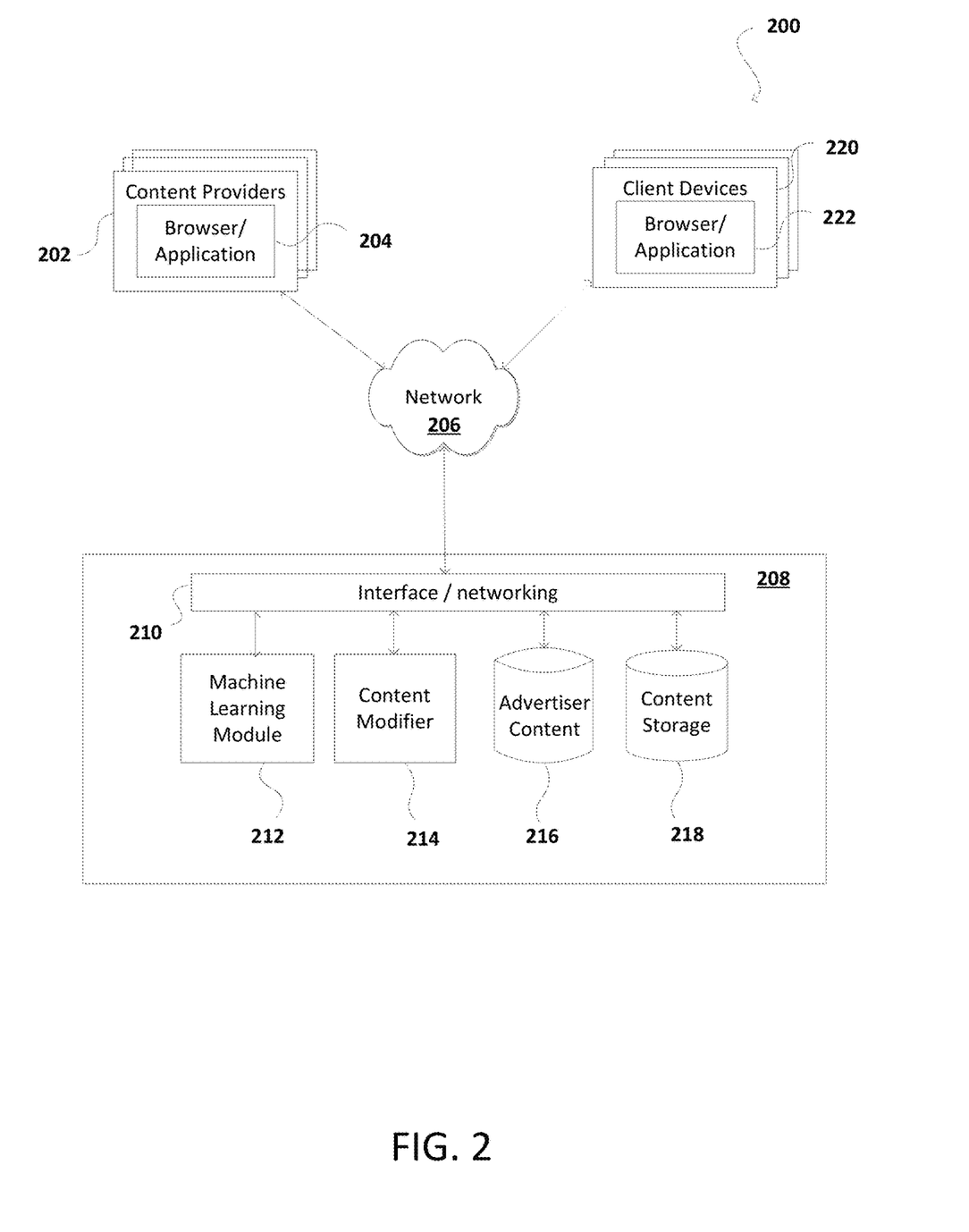
FIG. 2 illustrates example system architecture for performing the disclosed embodiments in accordance with another aspect of this disclosure.

FIG. 2 illustrates an example system architecture 200 for performing the disclosed embodiments in accordance with a further aspect of this disclosure. The system architecture 200 includes content providers 202 in communication with content servers 208 and with client devices 220, via network 206. As noted with respect to FIG. 1A, the content providers 202 may incorporate features of the content servers 208 as discussed subsequently herein to process content in a similar manner as the content servers 208. Client devices 220 and content provider devices 202 can include any processor and memory based electronic devices with capabilities as disclosed herein, but at least with the capability to execute computer-readable instructions in a browser or to execute computer-readable instructions with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop computers, set-top boxes, personal data assistants, electronic book readers and the like. Each of these electronics devices may be configured to include a browser or a stand-alone application 204/222 that is capable of being configured in the manner of this disclosure. In an implementation, content providers 202 may use the content server 208 to run tests on hardware and software features or services offered in the system architecture 200. Users or consumers of electronic or online products and/or services use the client devices 220 to interface with a website providing such content.

Network 206 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 200 can depend at least in part upon the type of network and/or environment selected. Protocols and components for communicating via such a network are well known and will not be discussed herein in detail. Communication over the network 206 can be enabled via wired or wireless connections and combinations thereof. In this example, the content server 208 may include one or more local servers in communication with each other and with other remote servers via the network 206. In an example, the content server 208 includes a web server for receiving requests and serving content from the client devices 220 and/or the content providers 202. In response thereto, although for other networks, an alternative device serving a similar purpose as any one of the content server 208 could be used, as would be apparent to one of ordinary skill in the art upon reading this disclosure.

In a further example, the content providers 202 may include a content console 222 for communicating with the content server 208. The content console may be an internet-enabled application (e.g., browser/stand-alone application) that is configured to execute on the content provider 202 and is configured to communicate with the content server 208 in the manner described herein. The communications between the content server 208 and the servers/devices of FIG. 2 are via an interface or networking component 210, such as a network interface card or a wireless interface. In alternate embodiments, the system architecture 200 is maintained internal and confidential between the content providers 202 and the content server 208 during the configuration stages. Accordingly, one or more components or modules in the system architecture 200 are isolated from external influence by any known security methods, including firewalls, during configuration stages. Alternatively, sections of the one or more components or modules in the system architecture 200 are available within one or more content providers 202. In yet another alternative implementation, sections of the one or more components or modules in the system architecture 200 may be secure, while other sections of the one or more components or modules may be available in the public domain to interface with client devices 220. In accordance with such alternate implementations, one or more components or modules in system architecture 200 may also be virtual machines or operate in a virtual environment for performing one or more of the features disclosed herein.

Further, in the example architecture 200 of FIG. 2 real-time or dynamic search results are provided for queries from the client devices 220. For example, queries are addressed in real-time or dynamically via the machine learning module 212 and the content modifier 214, that may cooperatively function under two or more modes. In one of the modes, the machine learning module 212 may constantly improve upon itself using each new query and newly modified content as inputs to the machine learning module 212 to ensure a robust functionality. Such a mode may be referred to as a training mode. In an application of neural networks for the machine learning operations, the machine learning module 212 may train one or more neural networks with each new query and newly modified content while running active operations with a copy of an active previously-trained neural network. Once the new query and newly modified content has been trained to one or more inactive neural networks, the one or more inactive neural networks may be activated and the previously-trained neural networks may be inactivated for training. Alternatively, bulk queries and modified content is also available to train one or more neural networks during an assigned downtime.

In content server 208, the queries may be analyzed in the machine learning module 212 to determine identifiers of a first semantic relationship, such as noun identifiers. The determined identifiers and a database of terms in the content storage 218 are used to find second semantic relationships. For example, the database of terms includes a number of terms that may have a semantic relationship with the identifiers. The semantic relationships are comprised of measures that are then applicable to provide semantic terms. In an implementation, the semantic terms are then used (in addition to the query or instead of the query) to search the content storage 218 for relevant content. For example, a product database, different from the database of terms, may be used for the search with the semantic terms. Alternatively, the database of terms may be combined with the content database for additional economy and efficiency.

Retrieved content from the content storage is subject to the content modifier 214 for modifying the content prior to transmitting to the client devices 220. For example, the content modifier 214 may replace terms within the content with the semantic terms or with the identifiers themselves. Accordingly, it is required that the content is first analyzed in the machine learning module to determine the replaceable terms. The discussion with respect to FIGS. 4A-C may be utilized to perform such modification of the content. In an example, titles in the retrieved content may be modified to include one or more identifiers determined from the search query. In another example, a summary specification provided with the title may be modified in a similar manner as the titles. Thereafter, the content may be provided with advertisements from advertiser content 216 for rendering in the client devices 220.

In the alternative, terms from a corresponding description of the content may be used to modify the displayed portion (e.g., title or summary specification) of the content. For example, color information requested in the query may be verified from the description of the content and then used to modify an intended displayed portion of the content. For example, a query for a BLUE T-SHIRT may secure results from a retailer providing a title of MEN'S CLASSIC COTTON T-SHIRT. The present content modification process, however, may determine that the retailer provided, in a description for the product, that available colors include the color BLUE. The present content modification process then uses this information to modify the retailer's provided title to MEN'S CLASSIC COTTON T-SHIRT (BLUE). In addition, the modification of the content (e.g., title) is not to replace a term, but to add or delete language where it may benefit the user. In an example, using a previously described query of WATER PROOF POUCH FOR MODEL 1, a search result providing a title of WATERPROOF CASE, ACME BRANDED UNIVERSAL CELL PHONE DRY BAG POUCH FOR PHONE 6S MODEL 1 may be modified to WATERPROOF CASE, ACME BRANDED UNIVERSAL CELL PHONE DRY BAG POUCH FOR MODEL 1 with the PHONE 6S part removed. This removes section unrelated to the query and deemed as unimportant for the search process and the results displayed. Such an implementation efficiently presents content in a dynamic and useful manner—e.g., making use of the limited real estate to display search results.

Figure 3:
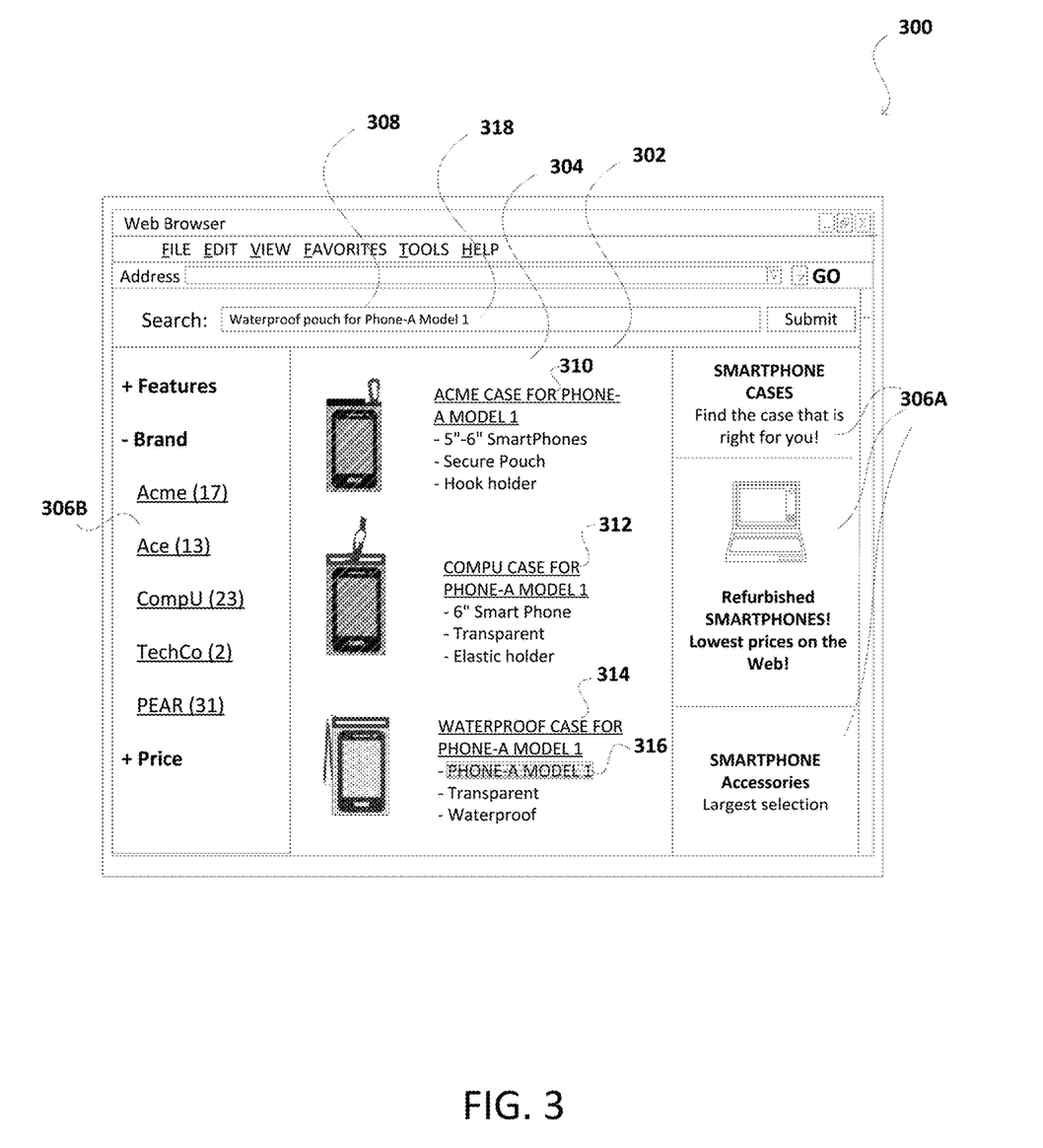
FIG. 3 illustrates an example of a window of modified search results that can be presented in accordance with various embodiments.

In yet another example, visual modifications may be provided instead of text modifications. Using the above example of the MEN'S CLASSIC COTTON T-SHIRT, instead of the addition of the term: (BLUE), the title may be modified to include an image or a color descriptor. For example, a blue box or shape may be presented at the end of the title. The example essentially determines a visual modification to the semantically similar terms from the query. The use of stored color information with associations to semantic terms may be used to implement such visual modification. As a result, the user interface displayed in the example electronic marketplace, e.g., webpage or content page 302, improves the ability of the computer to display information and interact with the user through the use of content modification that is dynamic and may resolve errors of the user selecting less relevant search results. This improvement leads to more accurate search results. The claims in this application, therefore, also resolve problems of prior graphical user interfaces in the context of item purchases—such as improving the speed of providing relevant search results, the accuracy of the search process, the usability of the search results, content suitability (e.g., parental controls to, additionally, remove or replace certain terms in a search result), and eliminating any doubts an online customer may have about purchasing a product online.

FIG. 3 illustrates an example 300 of a window of modified search results 304 that can be presented in accordance with various embodiments. This example, like the example of FIG. 1 utilizes an electronic marketplace as the content at issue. In the example 300, like in example 100 of FIG. 1A, the window may be a web browser or a stand-alone application for interacting with digital content of the electronic marketplace. A user may search or interact with the digital content via a search field 308. A query 318 is provided in the search field 308 in one implementation of the searching or the interaction with digital content. When the submit option is selected, the search may be initiated and processed on the computer or on a server as discussed in the implementations of FIGS. 1B and 2. In example 300 of FIG. 3, a query 318 for "waterproof pouch for Phone-A Model 1" is entered into the search field 308, and the search results are provided in the results section 304 of a webpage or content page 302. As illustrated, there are three results 310-314 on display, with an indication for more results (e.g., down arrow with text "MORE" at the bottom of the page 302 or the grey scroll indicator on the right of the page 302) if the page was scrolled down. Categories within the search results are presented on one side 306B of the search results, while sponsored content may be displayed on other available area 306A.

The search results 310-314 are illustrated as search results that are customized or modified to the user's query. As a result, the provided title of the content for each search result (or most relevant search results) 310-314 may reflect identifiers from the query itself or semantic terms associated with the identifiers. For example, the title from a similar search illustrated in example 100 of FIG. 1 is ACME CASE FOR SMARTPHONES (reference numeral 110), but in example 300 of FIG. 3, such a title is modified to state ACME CASE FOR PHONE-A MODEL 1 (reference numeral 310). Here, the brand name (i.e., ACME) remains along with other identifiers—e.g., CASE FOR, but at least one other identifier in the query—i.e, SMARTPHONES is replaced in the retrieved content/product name (i.e., to state PHONE-A MODEL 1). When the user selects the link of the search result 310, then the user is directed to the product or content associated with the original content ACME CASE FOR SMARTPHONES as in reference numeral 110 of FIG. 1. As such, this implementation dynamically modifies content to provide specific results to the user that closely reflects the user's query. The above titles, also based on the below implementation of the machine learning reflects accurately on the product or content searched. Specifically, the machine learning identifies the product or content as related to PHONE-A MODEL 1, even if the title does not indicate this with the requisite clarity. This dynamic modification based in part on the query informs the user better, provides improved search accuracy, and improves visibility for products/content from the associated content provider.

In addition to the above, the summary specifications for each content 310-314 may be modified as well. As illustrated with respect to content 316, the previous summary in reference numeral 116 of FIG. 1 stated DEVICES UPTO 6.0, but this has been modified to PHONE-A MODEL 1. In an alternate implementation, a highlight or marker of any sort may be applied to the modified portion of the content to reflect that dynamic modification has occurred. In the example 300 of FIG. 3, a marked highlight 316 is illustrated over PHONE-A MODEL 1 to reflect this. In addition, a decay function may be associated with the marked highlight 316. The decay function, in one example, may cause the highlight to draw the customer's attention to it and then fade over the decay time set in the decay function. Such an implementation further improves the user interface displayed in the example electronic marketplace as discussed above. For example, the decay function improves the ability of the computer to display information and interact with the user through the use of content modification that dynamically indicates relevant information to the user's query. In another aspect, along with or separate from the marked highlight 316, the modified portion of the content 314 might be subject to the decay function as well. For example, the modified portion may fade to the original terms in the content and may fade back to the modified portion. Alternatively, a hover-over event may be implemented for a cursor action. Here, a timing function determines the hover-over time of a cursor over the modified portion (e.g., marked highlight 316). As such, when the cursor hovers over the "PHONE-A MODEL 1" modification for the time specified in the timing function, the modification may revert back to the original term that existed prior to the modification.

In another example aspect, the summary specifications 316 may be displayed as an image from the retrieved content. For example, certain products provide stickers or labels providing critical or relevant information. Health supplements or food items may provide nutrition information in their labels. Such text may be retrieved as part of the search process herein. Such text may be modified in a similar manner as with the example of the content in FIG. 3. The text may be modified to replicate identifiers from the query, but also may be modified with other semantic information found in the product database for the specific health supplement or the specific food item. In yet another implementation, when such modification occurs, it may occur as an overlay to the original sticker or label, or as a modified version of the original sticker or label. In this manner, at least a search result listing may be seen as perfect match to the search query when the label or sticker provides information that is semantically similar to the search query or uses terms from the search query or elsewhere in the product description. Accordingly, the disclosure herein is available to modify any content type, including images and audio-based searching, in a similar manner as described above, to semantically match to query. In an example, audio-based searching may be based of text-to-audio read-back, where modified text is read-back as a response provided to an audio-based query. In further examples, image modification may include modification of image portions using semantically similar images or representations in the images. In an aspect, zoomed versions or highlighted portions of an image or select (or certain) views or frame from a video may be modified with relevant portions of image, audio, video to match queried images, audio, or video. For example, label portions of product images may be fully or partly replaced to semantically match the query or using other information from a corresponding product description that may not be on one view of the product, but may be on the label-side view of the product. Product images, videos, and audio are, therefore, subject to content modification to match closely with queried inputs.

Figure 4A:
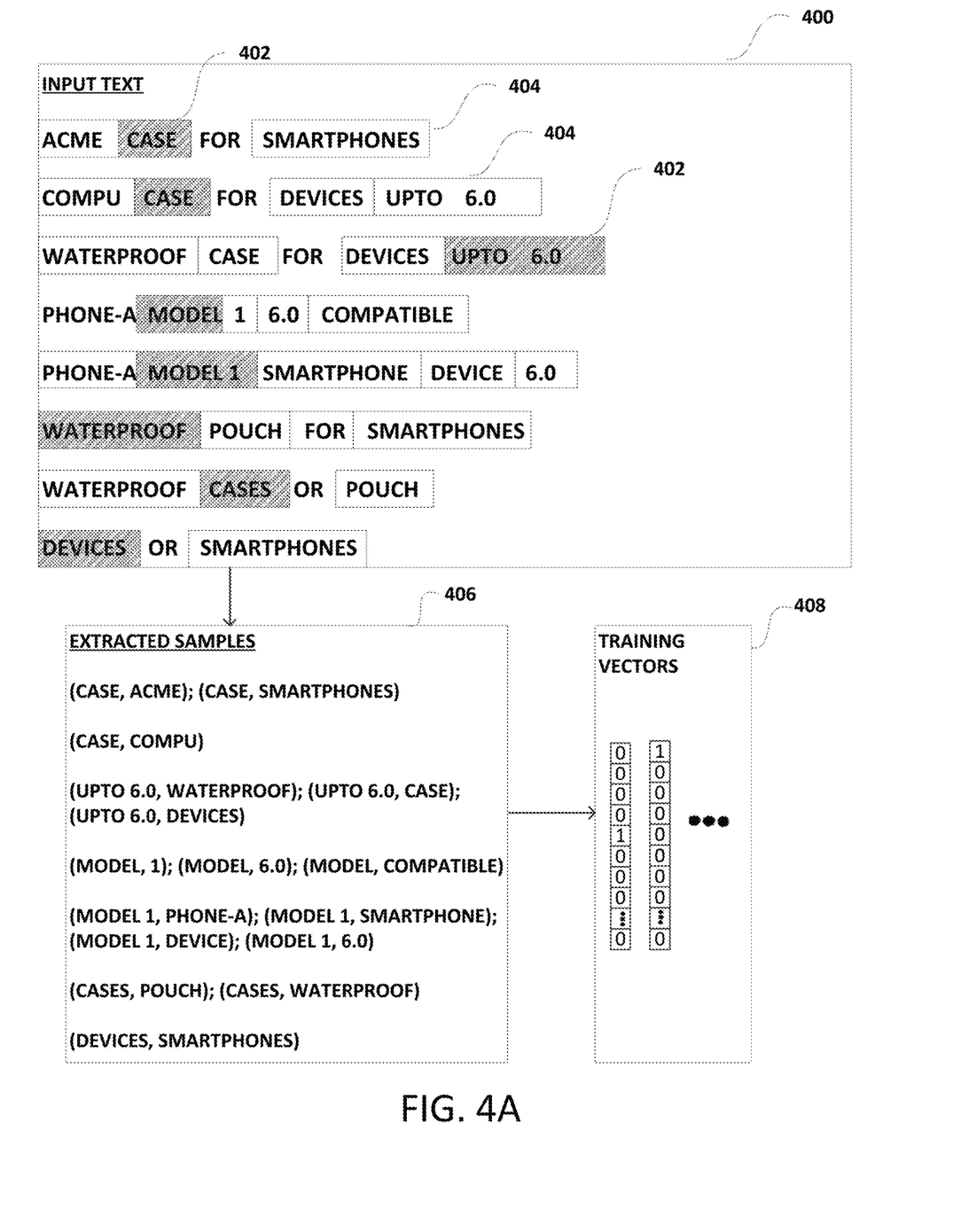
FIG. 4A illustrates an example of semantic processing for machine learning in accordance with various embodiments.
Figure 4B:
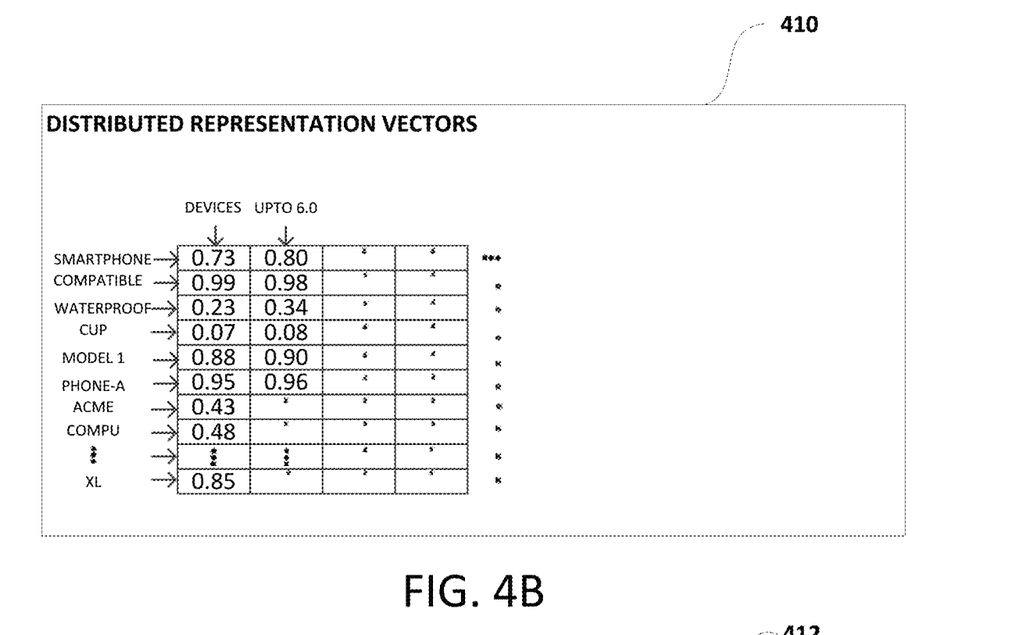
FIGS. 4B and 4C illustrate other examples of semantic processing for machine learning in accordance with various embodiments.
Figure 4C:
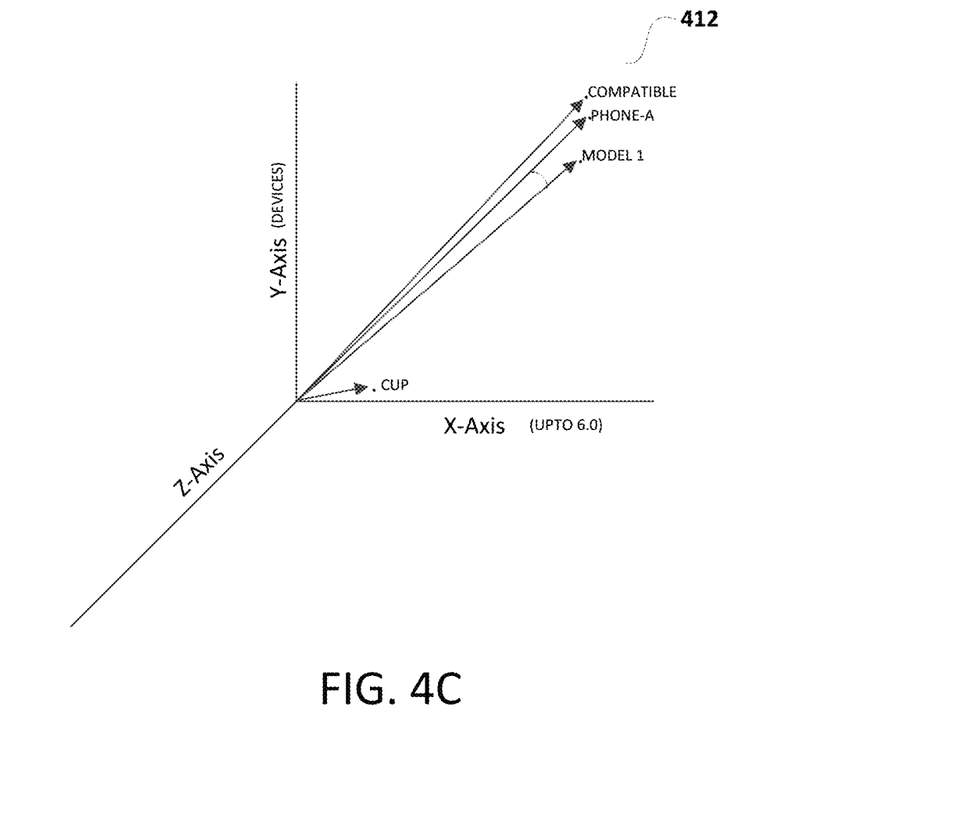

FIG. 4A to 4C illustrate examples of semantic processing for machine learning in accordance with various embodiments that may be applied to achieve the above modification of content. The machine learning provides a module to which the query from the search is provided and from which terms selected for modification are identified. Input text 400 may include presently provided queries or text from content databases associated with content providers. In addition, text generally available on various networks, platforms, or entities may be used to build a robust machine learning process. For example, social media, advertisements, reviews, and other resources may be used to train neural networks to recognize replaceable terms and to perform modification to content in accordance with search queries.

FIG. 4A demonstrates input text 400 that may be generally available as a search query or from the other example platforms previously noted for machine learning. While the use of input text 400 may require unsupervised learning for classification, specific datasets (including input text 400) may be defined to support supervised learning implementation for one or more neural networks as part of the machine language implementation in this disclosure. A select root term may be chosen around which the training is performed. For example, in the input text 400, the first three input texts include a respective root terms 402. The first three input texts also include associated terms 404 used for training with the respective root terms 402. The associated terms 404 may provide context to the root term and helps with the machine learning process. The remaining input texts in reference numeral 400 similarly follow the first three input texts. In the machine learning process, term samples 406 are extracted from the input text 400. For example, the term samples include the root term 402 and each associated term 404—such as (CASE, ACME); (CASE, SMARTPHONES) for the first input text in reference numeral 400.

The machine learning process trains a neural network to recognize that CASE and ACME share a contextual relationship such as a semantic relationship. Similarly, CASE and SMARTPHONES share a semantic relationship for being used with each other. While the input text 400 is demonstrated as one set of input texts, there are large numbers of such input texts that are utilized in the machine learning process and that provide similar contextual input. For example, if CASE and SMARTPHONES are often used together then a large number of input texts would include these two terms. When these large numbers of input texts comprising these terms are used to train a neural network, using the terms interchangeably as root and associated terms, then such a trained neural network would be able to predict one of these terms when provided with the other term as an input. For example, a neural network trained to recognize these two terms as semantically related will provide an indication that SMARTPHONES is a predicted output word when CASE is provided as an input.

Further, while the extracted samples 406 are illustrated as a root word and associated word, a window of three or more terms may be used to provide additional context. Then neural networks may be trained to recognize that each root word may be semantically related with two or more associated terms. While providing training vectors 408 for each word, it may be prudent to use a more robust training vector. The training vectors 408 typically represent a single word with Os in all rows, but a 1 in a single row to represent a word—e.g., CASE. This is also referred to as a one-dimensional representation of a word. The training vectors 408 may be used as provided, but an option to use distributed training vectors 410, as illustrated in FIG. 4B, is also available. The distributed training vectors are typically a transformation of one-dimensional training vectors to form a multi-dimensional representation of words. As such, this transformation may be seen as a process of determining vector of semantic terms (e.g., a sentence) by averaging individual terms in the individual vectors.

In an implementation, the one-dimensional representation of a word may be prepared for the transformation to a multi-dimensional representation of words based on a matrix multiplication with a feature matrix. The feature matrix may typically provide the word's relationship to the words forming the multi-dimensional representation. For example, using a single word's one-dimensional training vector, a neural network with a hidden layer and multiple related words may be trained to recognize the single word from multiple related words. In such an implementation, the back propagation of error and the feed-forward process may correct initial random values in the hidden layer to an accurate representation of a multi-dimensional vector for the word's relation to other words. In FIG. 4B, the words in the query of FIGS. 1 and 3 are provided in comparison with other words generally available in a database of terms through a multi-dimension vector.

In another example aspect, word to word comparison may be performed, and may be extended to multiple words in a window. A training vector for a word, as illustrated in reference number 408, may be first converted into a feature representation using a feature matrix. A feature matrix is composed of various values associated with unique features in text. For example, words with known relationships to other words may be a feature predefined in the feature matrix. The distributed representation vectors 410 may represent one such implementation. The training vector for a word may be multiplied with the feature vector to provide the feature representation. As the training vector for each word is a single row of multiple Os and a single 1 entry, the resulting feature representation will be a single row of multiple columns of values. To find a relationship between words, two respective feature representations—one for each word—is multiple and fed to a classifier. In an example the classifier may be a softmax classifier which is a normalized function that typically functions to marginalize the largest value from the lower values in a provided input. As a result, highly related words are classified in a manner to distinguish a lesser relationship word-pair.

For example, the multiplied values from the feature representations of word A with a word B may provide a singular value. A similar evaluation of word A may be performed with multiple words. Following this the classifier may be applied to the collection of singular values to provide a vector distribution of the words associated with word A in different levels of closeness. The closeness demonstrates a sematic relationship from prior use of the words associated with word A. The vector distribution may represent a trained network which will be able to predict a word to output when the input word is Word A, following from the above example. Considering the above application in a multi-dimensional plane, with multiple words and relationships, a trained neural network will be able to identify relationships based on the numerical values associated with words. As such, an input of two or three words allows the trained neural network to predict a word that is bears a relationship to both words. Such a trained neural network may also be designed to provide a level of closeness (semantic relationship) between input terms.

FIG. 4C illustrates another intermediate processing feature for modifying content based in part on a query. When a trained neural network indicates that semantic relationships exists between terms in the query and terms in a database of terms, then the trained neural network may be configured to provide such information. In FIG. 4C the information as to semantic relationships is provided in the form of a graph 412. The query words DEVICES and UPTO 6.0 are determined as related with respect to certain other commonly used words—e.g., SMARTPHONE, COMPATIBLE, PHONE-A, and MODEL 1, as demonstrated in the feature matrix 410 of FIG. 4B. While the graph is provided to visualize distances between words as defined in their determined semantic relationships, it is understood that a configured system may not graph the relationships, but merely provide the outputs. As a result, the closest determined terms, by semantic relationships, may have the least distance as calculated by a cosine distance measure or a Euclidean distance measure—once normalized.

In an application of the above trained neural network, once a search of the content database is completed, the retrieved content is analyzed in the manner above to identify semantic relationships in the query terms. A further analysis is performed to determine semantic relationships between words in the retrieved content and the query terms. Finally, the example process herein modifies at least the title, and optionally, the summary specification of the retrieved content in accordance with the above-determined semantic relationships. For example, the words PHONE-A and MODEL 1, having found to be semantically similar to retrieved content terms, such as DEVICES and UPTO 6.0, may be applied to replace these words from the retrieved content. In another implementation, the words COMPU and CASE may also be replaced with WATERPROOF and POUCH, depending on the measures of semantic relationships determined for each of these terms. As a result, at least one of the search results in 304 of FIG. 3 may be further modified to provide a title such as WATERPROOF POUCH FOR PHONE-A MODEL 1 instead of COMPU CASE FOR DEVICES UPTO 6.0 as provided in the example search result 112 of FIG. 1A.

In an implementation, the above machine learning is performed in a continuous manner, but at least before a search query or in anticipation of a search query. Such an implementation represents pre-commutation to improve search results and to make the computing process more efficient. The pre-computation may occur in anticipation of a search—e.g., for products suddenly in demand (new products, information from new press releases, items on sale, accessories related to new products, etc.). In an example, the pre-computation process monitors for the sudden surge in a specific search terms and stores semantically similar terms to the search terms, but also indexes search results for subsequent searches to a first time search. This improves latency of the search process from users' perspective, but also enables efficient computing as it reduces the burden on the content server 208 (including its related computing devices and modules) to calculate similarity on-the-fly. The combination of pre-computed modification at near real-time with dynamic modification may also be implemented depending on the work-load at the content server. At high traffic times, the work-load may be higher and the demand for resources may need to be balanced with respect to the in-demand content. In such instances, pre-computing may be triggered to benefit the dynamic modification for the search results.

As a result, the use of the present content modification process provides a solution to a network and computer related issue of latency and traffic management for high traffic networks. A user able to secure their specific match may not browse through multiple pages of search results or select to open multiple pages of product information from the search results. This reduces traffic to the content server (and related computing devices). This also reduces the work-load to these devices or allows the devices to be used to perform other tasks than providing pages of search results. In addition, this also removes from any requirement to store search results for anticipated access when the system provides the query-specific search results in the very first page. This alleviates storage issues as the content server processes query and retrieves data for numerous queries every second.

Another technical benefit realized in the use of the present disclosure is the ability to efficiently use display space in the user interface of the electronic marketplace or content display. The specific search results—those with modified content—may be provided the first part of the search results, with other search results in the remaining section. The user interface may also be dynamically modified to indicate the specific search results separately from the general search results, and with the addition of sponsored search results (paid content, e.g., advertisements). In an example, when a user is determined as from a mobile device or using a connection deemed as limiting (e.g., cost prohibitive or high loss/latency connections), it may be most efficient to provide the specific search results alone. This may require dynamic modification of the results page to display the specific search results with the modified content representing an exact match for a user's query.

Figure 5:
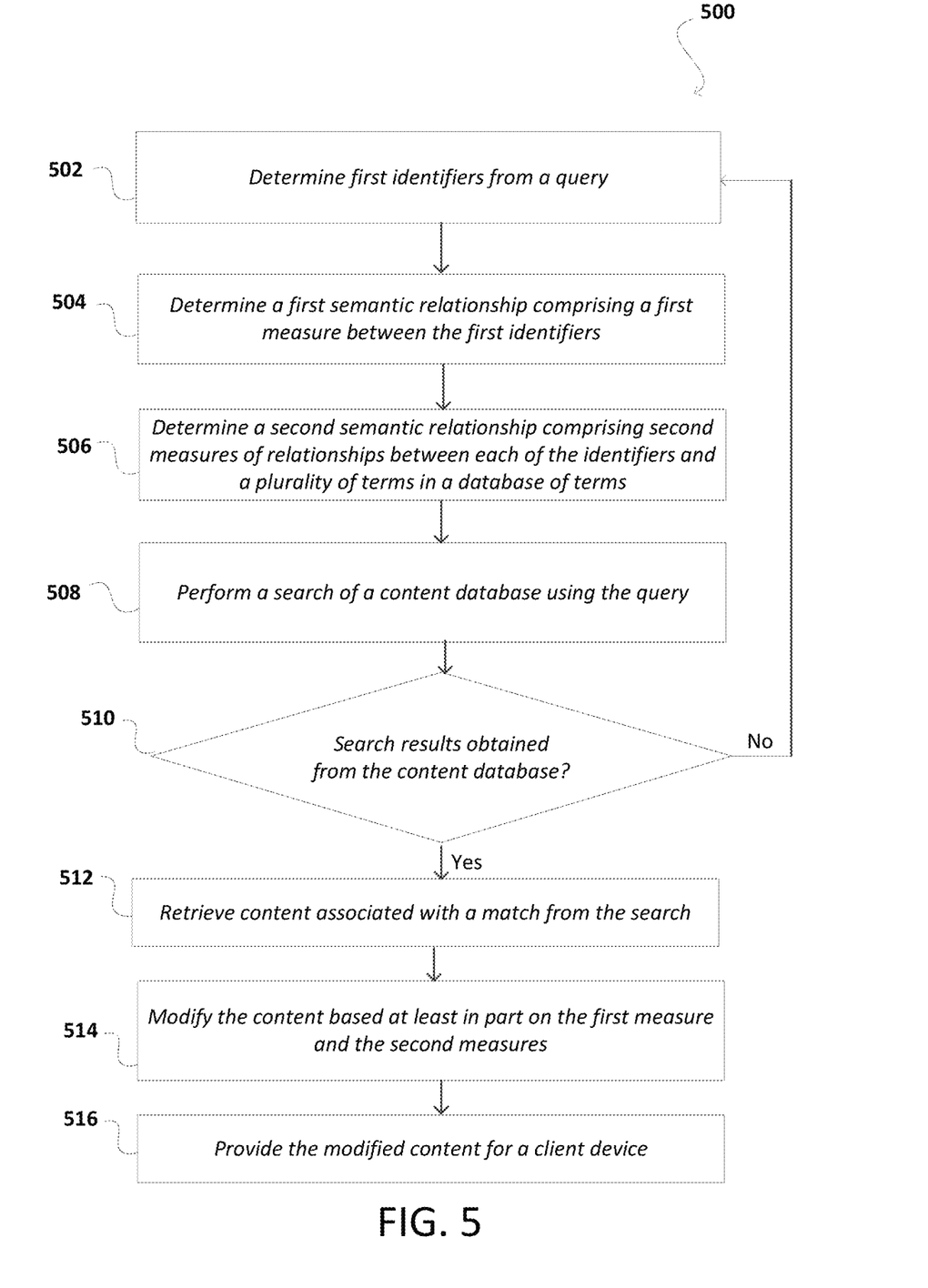
FIG. 5 illustrates an example process for modifying content in accordance with various embodiments.

FIG. 5 illustrates an example process 500 for modifying content in accordance with various embodiments. Sub-process 502 determines first identifiers from a query. Such identifiers may be noun identifiers, in one implementation. For example, product-specific queries are typically noun words and a modification of nouns words in the retrieved content with noun words from the search query provides a clear indication of a near-perfect match to a query. Other parts of the query are also applicable for modification depending on semantic relationships identified using the present disclosure. Further, identifiers, words, and terms are used interchangeably in this disclosure to refer to words, phrases, or sentences that may be wholly replaced when a trained neural network is configured to recognize such words, phrases, or sentences. Sub-process 504 performs a determination for a first semantic relationship including a first measure between the first identifiers. Such a determination provides context for the terms to be replaced from the query. Furthermore, such a determination may be useful, in an alternative implementation, to generate semantic words, phrases, or sentences to perform the search of the content database in lieu of the query or with the query.

Sub-process 506 performs a second determination for a second semantic relationship including second measures of relationships between each of the identifiers and a plurality of terms in a database of terms. A person of ordinary skill would recognize that sub-processes 504 and 506 may be performed after the search of the content database and may then limit the determination of the semantic relationship to terms in the retrieved content alone. However, in an alternate aspect, a robust process supports a determination of semantic relationship that is independent of the retrieved content to prevent skewing the search results if the retrieved content is erroneous. Furthermore, the use of semantic terms from the database of terms during the search process also enables a robust search result.

Sub-process 508 performs a search of a content database using the first identifiers. As previously noted, such a search may also rely on semantic terms from the database of terms (in lieu of the query terms or with the query terms). Sub-process 510 verifies that search results are available for the query. When there are no search results, the process herein may, in an example aspect, rely on the semantic terms automatically. The sub-process 510 may repeat sub-process 512 to change terms for which semantic relationships are sought. When there are search results, the process 500 proceeds to retrieve the content, and in one example, to retrieve titles associated with a match from the search. Sub-process 514 modifies the content (e.g., an individual title of the retrieved titles) based at least in part on the first measure and the second measures. As explained in detail with respect to FIGS. 1A to 4C, the semantic similarity between identifiers in the query to terms in the titles provide a basis for replacing the terms in the titles with the identifiers in the query. This provides an appearance of a near-perfect match in the content to the query. Sub-process 516 provides the modified content (including, for e.g., the modified individual title) for a client device that provided the query.

In an example implementation, the process 500 is also configured to provide a reference link associated with the modified individual title. The reference link enables securing of a product referenced by the individual title from the retrieved content. This ensures that even though the content is changed, the underlying reference information provided from a content provider remains unchanged. In such an implementation, the relevant content provider gets credit for providing matching content.

In one aspect of this disclosure, a separate process may be provided for replacing terms in the content. Such a process may include determining a replaceable term in the individual title using the semantic relationship for the terms as previously noted. For example, when a term in the content is shares a semantic measure that surpasses a threshold with a query term, then the term in the content may be replaced with the query term. Accordingly, the replaceable term in the content is replaced with (a) at least one of the two noun identifiers from the query or (b) at least one of the semantic terms to provide the modified individual title. Thereafter, the reference link is attached to the modified individual title as a hypertext link to ensure that the user is still directed to the original content identified during the search.

In a further example of the above implementation for determining relatable terms, a sub-process determines an individual distance measure for text identifiers in the individual title to terms in the database of terms. Such a determination may include identifying, in the database of terms, associated terms for each of the text identifiers and measuring distances between each of the associated terms, where the distances are limited by a pre-defined value. As previously noted, when the trained neural network is normalized, the distances using either cosine distance or Euclidean distance may provide similar benefits. So either measurement processes are applicable here. This example implementation further includes determining that an individual text identifier of an individual associated term from the associated terms is the replaceable term. Such a determination occurs when the individual associated term has a largest distance measure within the pre-defined value.

The present disclosure also contemplates that when there are semantic terms in the database of terms that share a stronger relationship to the query term then those sematic terms may be used to modify the content instead of the query terms. As such, instead of WATERPROOF POUCH FOR PHONE-A MODEL 1 as a content title to replace an original content title of COMPU CASE FOR DEVICES UPTO 6.0, a content title of WATERPROOF CASE COMPATIBLE WITH PHONE-A MODEL 1 or COMPU CASE COMPATIBLE WITH DEVICES UPTO 6.0 may be provided. Here, the phrase COMPATIBLE WITH was found to have semantic relationships with the word FOR when used with the words CASE, DEVICES, and UPTO 6.0 or PHONE-A MODEL 1. In an example, to perform such an implementation, a sub-process of process 500 may perform a determination for an individual term of the terms that has a lesser distance measure than the largest distance measure (previously calculated as within a pre-defined value) and provides the individual term as one of the semantic terms for replacing the replaceable term.

Figure 6:
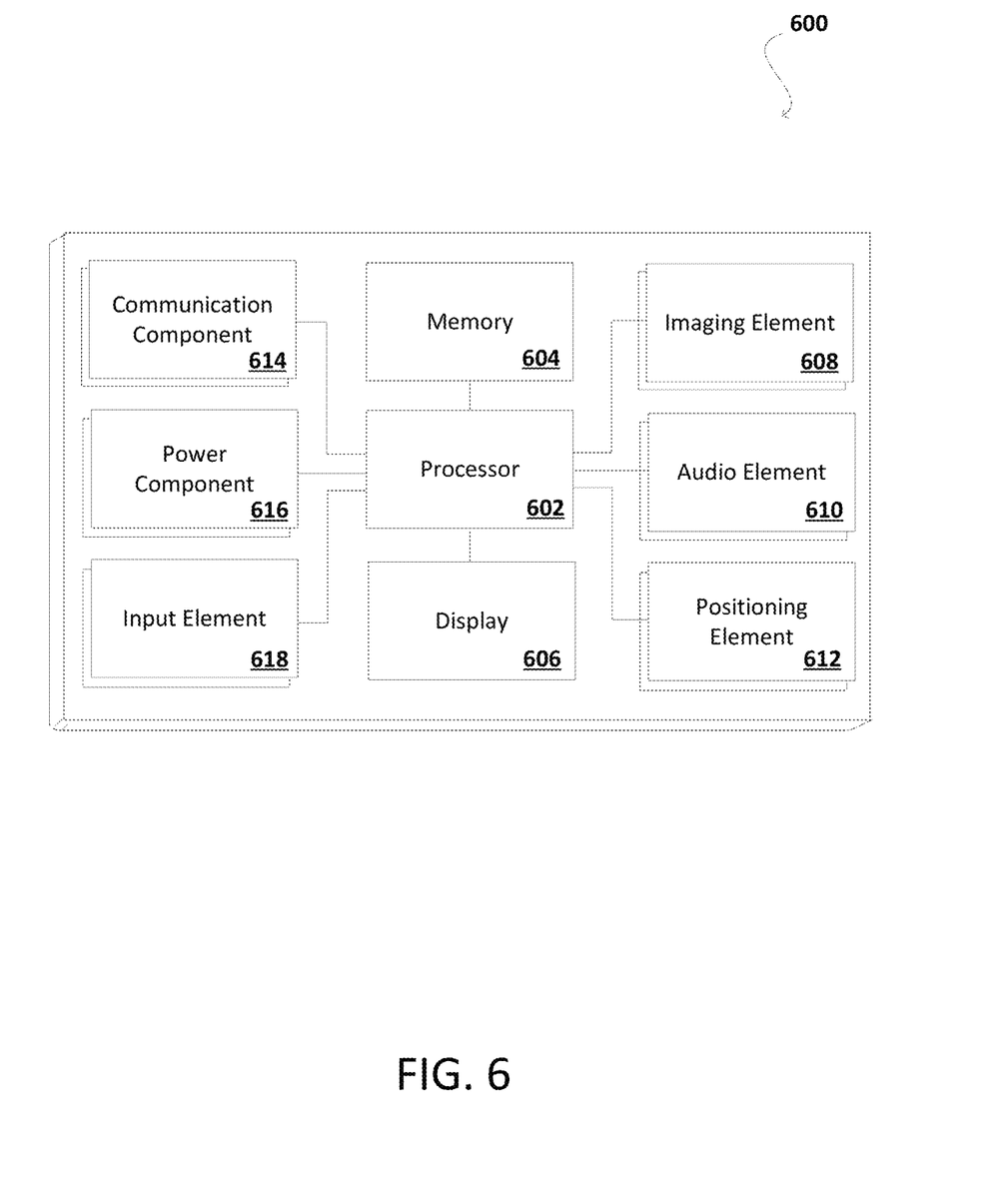
FIG. 6 illustrates example components of a computing device that can be utilized in accordance with various embodiments.

FIG. 6 illustrates a logical arrangement of a set of general components of an example computing device 600 that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 618 that is able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands using imaging element 608 and audio element 610, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a query in an electronic marketplace;
determining at least two identifiers in the query;
determining a first measure indicative of a first semantic relationship between the at least two identifiers;
determining, for each of the at least two identifiers, second measures indicative of second semantic relationships between individual ones of the at least two identifiers and a plurality of semantic terms in a database of terms;
performing a search of a product database using the at least two identifiers;
retrieving titles and product information associated with products that are identified in response to performing the search, wherein individuals of the titles include one or more terms;
modifying a replaceable term of the terms of an individual title of the retrieved titles based at least in part on the first measure and the second measures;
generating a webpage to provide the product information and the modified individual title as part of the electronic marketplace; and
providing a reference link associated with the modified individual title and the product information referenced by the individual title.

2. The computer-implemented method of claim 1, further comprising:
modifying the product information by replacing one or more terms in the product information with at least one of the at least two identifiers in the query based at least in part on the first measure and the second measures; and
providing the modified product information for the webpage.

3. The computer-implemented method of claim 1, further comprising:
replacing the replaceable term with (a) at least one of the at least two identifiers from the query or (b) at least one of the semantic terms to provide the modified individual title; and
attaching the reference link to the modified individual title as a hypertext link.

4. The computer-implemented method of claim 3, further comprising:
determining an individual distance measure between each of the terms in the individual title to the semantic terms in the database of terms by:
identifying, in the database of terms, associated terms for each of the terms in the individual title based on semantic similarity between an individual term in the individual title and each of the associated terms; and
measuring distances between individual ones of the associated terms, wherein an individual distance is indicative of semantic similarity between two given associated terms; and
determining that an individual term of the terms in the individual title is the replaceable term when the one of the associated terms of the individual term has a largest distance measure within a pre-defined value.

5. The computer-implemented method of claim 4, further comprising:
determining that an individual term of the terms associated with the replaceable term has a lesser distance measure than the largest distance measure; and
providing the individual term as one of the associated terms for replacing the replaceable term.

6. A system, comprising:
at least one processor; and
memory including instructions that, when executed by the at least one processor, cause the system to:
determine first identifiers from a plurality of terms in a query;
determine a first measure indicative of a first semantic relationship between individuals ones of the first identifiers;
determine, for each of the first identifiers, second measures indicative of second semantic relationships between individual ones of the first identifiers and a plurality of semantic terms in a database of terms;
perform a search of a content database using the first identifiers;
retrieve content associated with a match from the search, wherein a match between the query and the retrieved content is based on semantic similarity between one or more terms in the content and one or more of the plurality of terms in the query;

modify one or more replaceable terms of the content based at least in part on the first measure and the second measures; and provide the modified content for a client device.

7. The system of claim 6, wherein the content includes an item associated with product information, including one or more of the replaceable terms, and a titles, including one or more of the replaceable terms.

8. The system of claim 7, wherein the instructions when executed further cause the system to:

replace at least one of the one or more replaceable terms in the product information with (a) at least one of the first identifiers from the query or (b) at least one of the semantic terms to provide the modified content.

9. The system of claim 6, wherein the instructions when executed further cause the system to:

determine one of the replaceable terms in the content;

replace the one of the replaceable terms of the one or more replaceable terms with (a) at least one of the first identifiers from the query or (b) at least one of the semantic terms to provide the modified content including a modified title and modified product information; and attach a reference link to the modified content, the reference link allowing selection of the modified title and, upon the selection, redirecting a user to the modified product information referenced by the link.

10. The system of claim 6, wherein the instructions when executed further cause the system to:

determine an individual distance measure between individual text identifiers in the content and individual ones of the semantic terms in the database of terms by:

identifying, in the database of terms, associated terms for each of the text identifiers in the content based on semantic similarity between an individual text identifier in the content and a given semantic term in the database of terms; and measuring distances between individual ones of the associated terms, the measured distance for a given pair of associated terms indicative of semantic similarity between the two associated terms; and determine that an individual term in the content is one of the replaceable terms when the one of the associated terms of the individual term has a largest distance measure within a pre-defined value.

11. The system of claim 10, wherein the instructions when executed further cause the system to:

determining that one of the associated terms associated with one of the replaceable terms has a lesser distance measure than the largest distance measure; and providing the individual associated term as a term for replacing the one of the replaceable terms.

12. The system of claim 6, wherein individual ones of the semantic terms in the database of terms is associated with a matrix or a vector representation in a semantic space.

13. The system of claim 6, wherein the content is provided in a format for rendering in a browser of the client device.

14. The system of claim 6, wherein the content is provided with a hypertext link associated with the modified content, the hypertext link for redirecting a user to original content referenced in an individual retrieved title of the content.

15. A non-transitory computer-readable storage medium storing instructions that, when executed by at least one processor of a computing system, cause the computing system to:

determine first identifiers from a plurality of terms in a query;

determine a first measure indicative of a first semantic relationship between the individual ones of the first identifiers;

determine, for individual ones of the first identifiers, second measures indicative of second semantic relationships between individual ones of the first identifiers and a plurality of semantic terms in a database of terms;

perform a search of a content database using the first identifiers;

retrieve content associated with a match from the search, wherein a match between the query and the retrieved content is based on semantic similarity between one or more terms in the content and one or more of the plurality of terms in the query;

modify one or more replaceable terms of the content based at least in part on the first measure and the second measures; and provide the modified content for a client device.

16. The non-transitory computer-readable storage medium of claim 15, wherein the content includes an item associated with product information, including one or more of the replaceable terms, and a title, including one or more of the replaceable terms.

17. The non-transitory computer-readable storage medium of claim 15, wherein individual ones of the semantic terms in the database of terms is associated with a matrix or a vector representation in a semantic space.

* * * * *